United States Patent [19]
Caplin

[11] Patent Number: 5,806,800
[45] Date of Patent: Sep. 15, 1998

[54] DUAL FUNCTION DEPLOYABLE RADIATOR COVER

[76] Inventor: Glenn N. Caplin, 456 29th St., Manhattan Beach, Calif. 90266

[21] Appl. No.: 577,596

[22] Filed: Dec. 22, 1995

[51] Int. Cl.[6] .................................................. B64G 1/50
[52] U.S. Cl. ........................ 244/158 R; 244/163; 165/41
[58] Field of Search ................................ 244/158 R, 163; 165/41, 104.14, 171

[56] References Cited

U.S. PATENT DOCUMENTS

| | | |
|---|---|---|
| 5,027,892 | 7/1991 | Bannon et al. . |
| 5,117,901 | 6/1992 | Cullimore . |
| 5,351,746 | 10/1994 | Mackey et al. . |
| 5,372,183 | 12/1994 | Strickberger . |

*Primary Examiner*—Andres Kashnikow
*Assistant Examiner*—Tien Dinh
*Attorney, Agent, or Firm*—Terje Gudmestad; Elizabeth E. Leitereg; Wanda K. Denson-Low

[57] ABSTRACT

The present invention is a dual function deployable radiator and radiator cover for use on a communication satellite. A deployable radiator is folded or in a "stowed" configuration over a fixed radiator when a satellite is in a launch vehicle. The deployable radiator thereby serves as insulation for the satellite when heat rejection is not necessary. When heat rejection becomes necessary, the deployable radiators are deployed whereby unwanted heat is rejected from the satellite. The deployable radiators, therefore serve a dual purpose, functioning as insulators for part of a mission and radiators for the remainder.

15 Claims, 3 Drawing Sheets

DUAL FUNCTION DEPLOYABLE RADIATOR COVER

BACKGROUND OF THE INVENTION

I. Field of the Invention

The present invention relates to radiator systems on spacecraft. More specifically, the present invention relates to a novel and improved apparatus and method for using a deployable radiator as an insulator as well as a radiator.

II. Description of the Related Art

The use of radiators in communication satellites is necessary to reject unwanted heat generated by equipment in the spacecraft. The heat generated may come from many sources, including high power amplifiers, propulsion systems, or any other energy dissipating units typically found within a satellite's payload structure.

There are both fixed and deployable radiators. Fixed radiators are ordinarily found on one to four sides of a satellite payload structure. Deployable radiators are ordinarily attached on the exterior of the satellite, and are stowed or folded while the satellite is in a launch vehicle. The stowed radiators are deployed at a time after launch when it is necessary to reject heat from the satellite.

There are periods during a mission, however, where many of the dissipative elements are not operational, making heat rejection not as necessary. One such period is transfer orbit, which is the period a satellite is maneuvered to its final operational destination. During transfer orbit, if the radiators sized to dissipate a large amount of heat are exposed to space while only a few heat dissipating elements are on, temperatures could reach as low as minus four hundred degrees (−400° F.). Consequently, radiator covers have been used to insulate fixed radiators during transfer orbit.

In the prior art, these covers were typically folded up solar arrays or a dedicated cover which served no other purpose. In the most common approach, the folded solar array, deployment of the array uncovered the radiator. This was acceptable since the deployed solar array provided sufficient power to the spacecraft such that heat dissipating elements could be turned on and a reasonable temperature achieved resulting from the equilibrium of the heat dissipating elements and the heat rejection of the radiator. In some missions it has become necessary to deploy the solar array to provide power during the transfer orbit to an electric propulsion system. In such a scenario, the electrical power from the solar array is used to propel the spacecraft and is consequently not available to heat the spacecraft. The prior art method of exposing the radiator when the solar panels deploy is unacceptable since extremely low temperatures would result with the power from the arrays propelling the spacecraft rather than heating it. Consequently, the radiators must remain covered with the solar arrays deployed. This could be done with a dedicated cover but because space missions are increasingly more demanding and are requiring larger payloads, it is always desirable to make a satellite's non-payload elements lighter and more compact. Hence, it is desirable to eliminate unnecessary equipment, or to find ways to eliminate the need for equipment without losing any real value or function. This is especially true since the limiting size of launch vehicles constrains the amount of equipment that can be stowed on the exterior of the satellite. In addition, ever increasing power levels require larger and larger radiators which have been constrained in the past by the rocket fairing.

The apparatus and method of the present invention achieves increased compactness by making radiator covers unnecessary while also substantially increasing the radiator area. The present invention accomplishes this by using deployable radiators as radiator covers. The deployable radiators therefore serve a dual purpose, functioning as insulators for part of a mission, alleviating the need for a separate cover, and providing radiators of substantially larger size than could be otherwise provided for the remainder.

SUMMARY OF THE INVENTION

The apparatus and method of the present invention achieves a lighter, more compact satellite design by stowing a deployable radiator over a fixed radiator, and using the deployable radiator as an insulator for part of a space mission. More particularly, the present invention stows a deployable radiator over a fixed radiator from the time a satellite is in a launch vehicle until the time that substantial heat rejection is necessary. The blanket is typically a multilayer insulating blanket consisting of multiple layers of Kapton™ coated on one side with aluminum. The aluminum has the thermal property of low emissivity. The Kapton™ serves as a structural backing. Consequently, heat transfer through the blanket is poor—the desired property—since heat must be radiated (as opposed to conducted, being there is no conduction path) from one layer of the blanket to the next, with each radiative transfer being inefficient due to the low emissivity property of the aluminum. More layers ultimately result in a greater insulating characteristic. Of course, other materials with similar thermal characteristics could be substituted.

In an exemplary embodiment, a deployable radiator is folded or in a "stowed" configuration over a fixed radiator when a satellite is in a launch vehicle. One surface of the radiator is covered with a thermally high emissivity material allowing efficient thermal radiation. This surface in the stowed condition is "face to face" with the fixed radiator. The opposite surface of the deployed radiator, or the space-facing surface in the stowed condition, is covered with a thermal blanket, i.e., a material which resists heat flow through the blanket. The radiator is connected to the fixed radiator by a hinge or multiple hinges. The deployable radiator is secured to the exterior of the satellite with launch lock fitting mechanisms. The deployable radiator remains stowed during transfer orbit. Since the insulation blanket resides between the spacecraft and deep space, it serves as an insulator for the fixed and deployable radiators. This is accomplished because the deployable radiator limits radiative heat transfer from outside to inside the satellite.

The deployable radiator is deployed by opening the locks automatically or sending a signal from ground control. The radiators are deployed at a time when heat rejection from the satellite is necessary. Upon deployment, both the fixed and deployed radiators are exposed and reject unwanted heat from the satellite. Once deployed, the radiators generally remain deployed for the duration of the mission although they could be retracted to the stowed position should the heat rejection requirements be reduced.

DETAILED DESCRIPTION OF THE DRAWINGS

DETAILED DESCRIPTION

Figure 1:
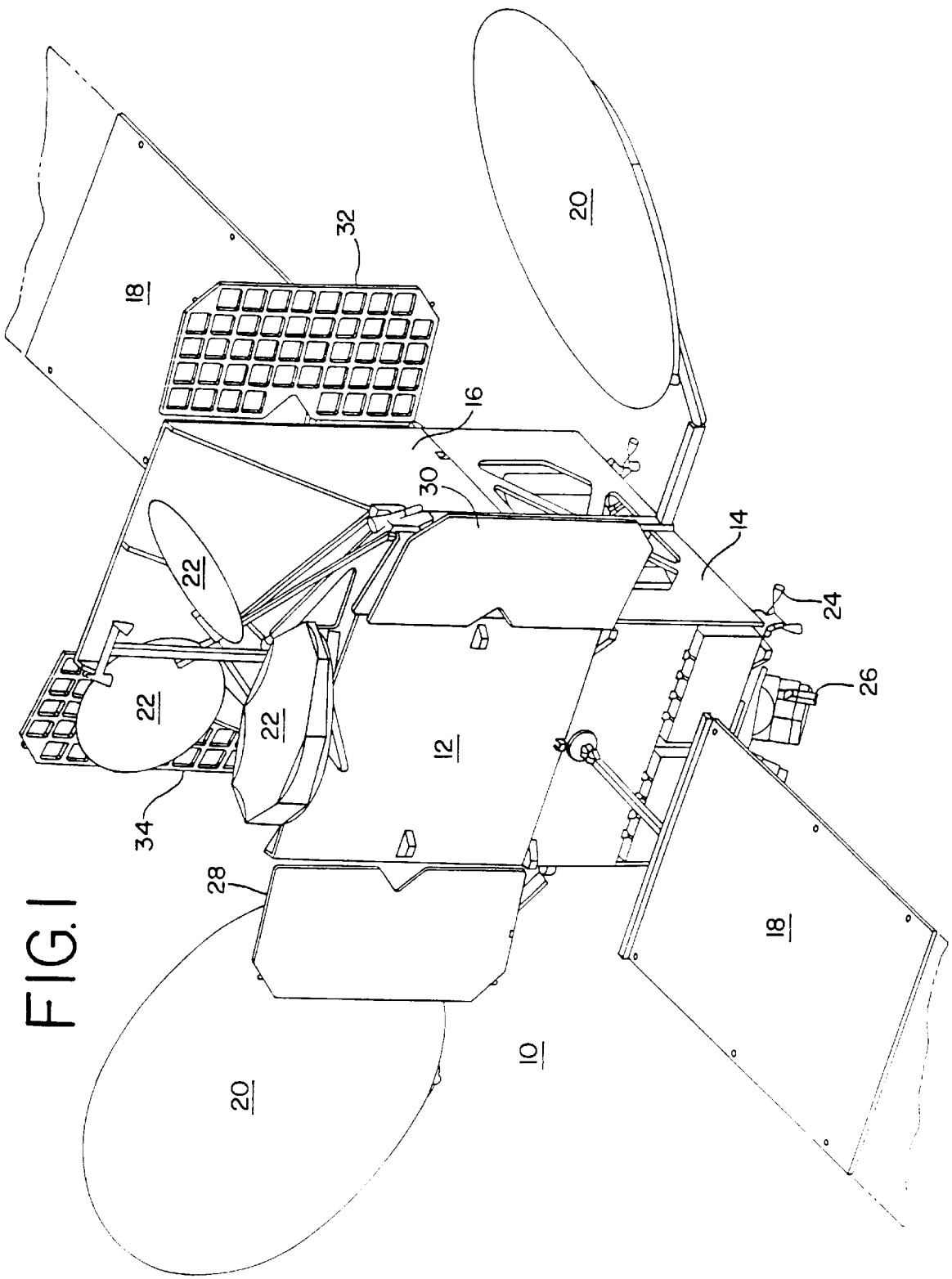
FIG. 1 is an illustration of a satellite capable of utilizing the present invention.

A spacecraft or satellite 10 capable of utilizing the present invention is shown in FIG. 1. The satellite 10 has a spacecraft body 12 which includes a lower bus module or platform 14 and an upper payload structure 16. Deployable radiators 28, 30, 32, 34 are connected to the payload structure 16. Unwanted heat energy within the satellite is conducted to the radiators and rejected from the satellite. Attached to the aft end of the lower bus module 14 are a plurality of engines. These engines include a centrally positioned liquid orbital thruster (not shown), four chemical propulsion engines 24 located at the corners of the bus module 14 and two pairs of xenon ion propulsion engines 26 (one pair shown). Lower bus module 14 contains fuel tanks (not shown) and various power and control modules that operate the engines and power the payload structure 16. Bus module 14 further includes a pair of solar panels 18 that convert sunlight into electricity. The electricity is sent to batteries (not shown) located on the bus module 14. Bus module 14 also has a pair of antennae 20, which receive signals from an earth ground station. The antennae 20 reflect the received signals into reflectors 22, which in turn, reflect the signals into receivers (not shown). The antennae 20 are used to control the satellite 10 and to send signals to the ground station.

Payload structure 16 is attached to the bus module 14 and contains a variety of electronic equipment which may contain a number of sensors (not shown). The electronic equipment processes information gathered by the sensors and sends the processed information back to the ground station via antennae 20. The gathered information may concern for example, communications, weather observation, and navigational information.

Figure 2:
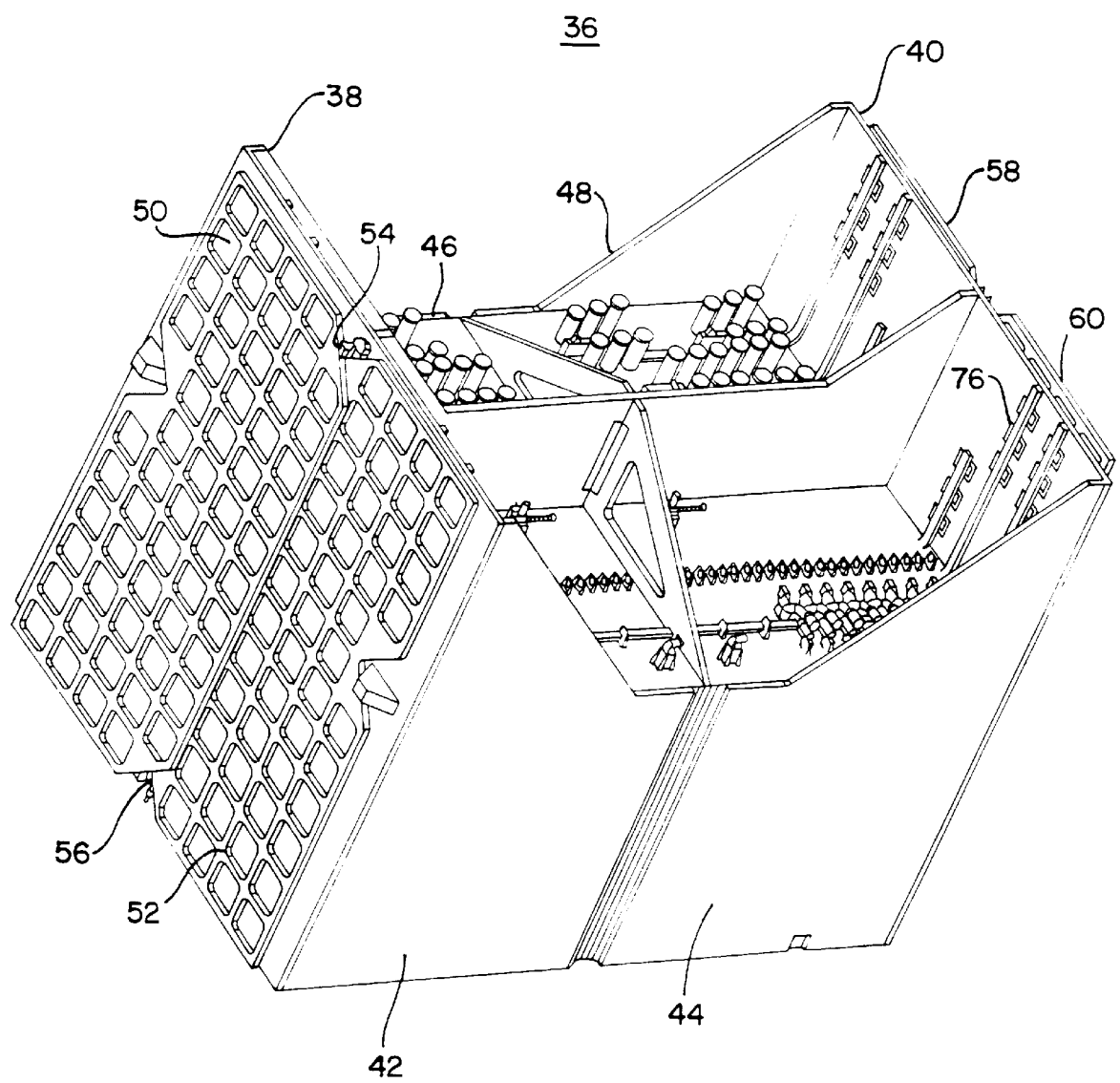
FIG. 2 is an illustration of a deployable radiator in the stowed position according to a preferred embodiment of the invention.

An exemplary deployable radiator system in which the present invention is embodied is illustrated in FIG. 2. There are fixed and deployable radiators on a payload structure 36. Typically, fixed radiators are employed on the sides of the satellite. Up to four deployable radiators may be located on the exterior of the satellite, each connected to the payload structure by (1) a hinge and (2) a means for transferring heat generated by heat dissipating elements in the payload module to the deployable radiator. This may be done for example with a heat pipe having a flexible joint. For the purposes of this description, the operation and makeup of one deployable radiator shall apply to the other deployable radiators on the satellite.

Both the fixed and deployable radiators work on thermoconductivity principles that are well-known in the art. Typically, the radiators function as heat dissipators. In the preferred embodiment, each radiator typically consists of an aluminum or kevlar honeycomb lattice. Of course, other materials having similar structural and thermophysical properties could be substituted without straying from the scope of the present invention. An aluminum sheet (not shown) is bonded to the lattice with room temperature vulcanized rubber. The vulcanized rubber is loaded with an iron filler thereby increasing the thermal conductivity of the rubber. For increased radiative capability, glass mirrors (not shown) which have the thermal properties of high emissivity and low absorbivity are typically bonded on top of the aluminum substrate on the space-facing side of the radiator in applications where there may be substantial solar exposure.

In the case of a deployable radiator, the surface of the radiator structure opposite the radiating surface is blanketed with a thermal insulator. When the deployable radiator is in the stowed position, this blanket thermally insulates the payload module.

At least one heat pipe 76 is in thermal communication with each radiator's aluminum substrate. In the preferred embodiment, the heat pipes are vapor-filled tubes that use a capillary effect to move hot vapor from heat sources to the radiators. The thermo-energy from the hot vapor is rejected from the satellite once it reaches the cooler radiators. As the vapor cools, it condenses to a liquid and circulates back to the modules, so that the process can repeat itself. Other systems and methods of heat rejection utilizing deployable radiators are herein contemplated and are within the scope of the present invention.

In the present invention, the deployable radiators begin in the folded or "stowed" position as the satellite is launched. The deployable radiators rest on top of the fixed radiators with the blanketed surface facing space, hence serving as an insulator. During the period between launch and destination orbit, known as transfer orbit, the deployable radiator is used as a cover for the fixed radiator to insulate the satellite from the extreme cold space temperature.

Referring to FIG. 2, a payload structure 36 for a communication satellite is shown. The payload structure 36 has a fixed radiator 38 on one side and a fixed radiator 40 on the opposite side. The payload structure 36 also has removable panels 42, 44, 46 and 48.

In the stowed position, deployable radiators 50, 52 have launch locks 54, 56 which secure the radiators during launch and transfer orbit. Deployable radiators 58, 60 also have launch locks (not shown). The deployable radiators are deployed by opening the locks automatically, or via a command from ground control, at a point where heat rejection from the satellite is necessary. In one embodiment, the launch locks are opened by detonating explosive charges in the locks. Once the launch locks are detonated, a spring mechanism (not shown) biased against the radiators will passively deploy the deployable radiators.

Figure 3:
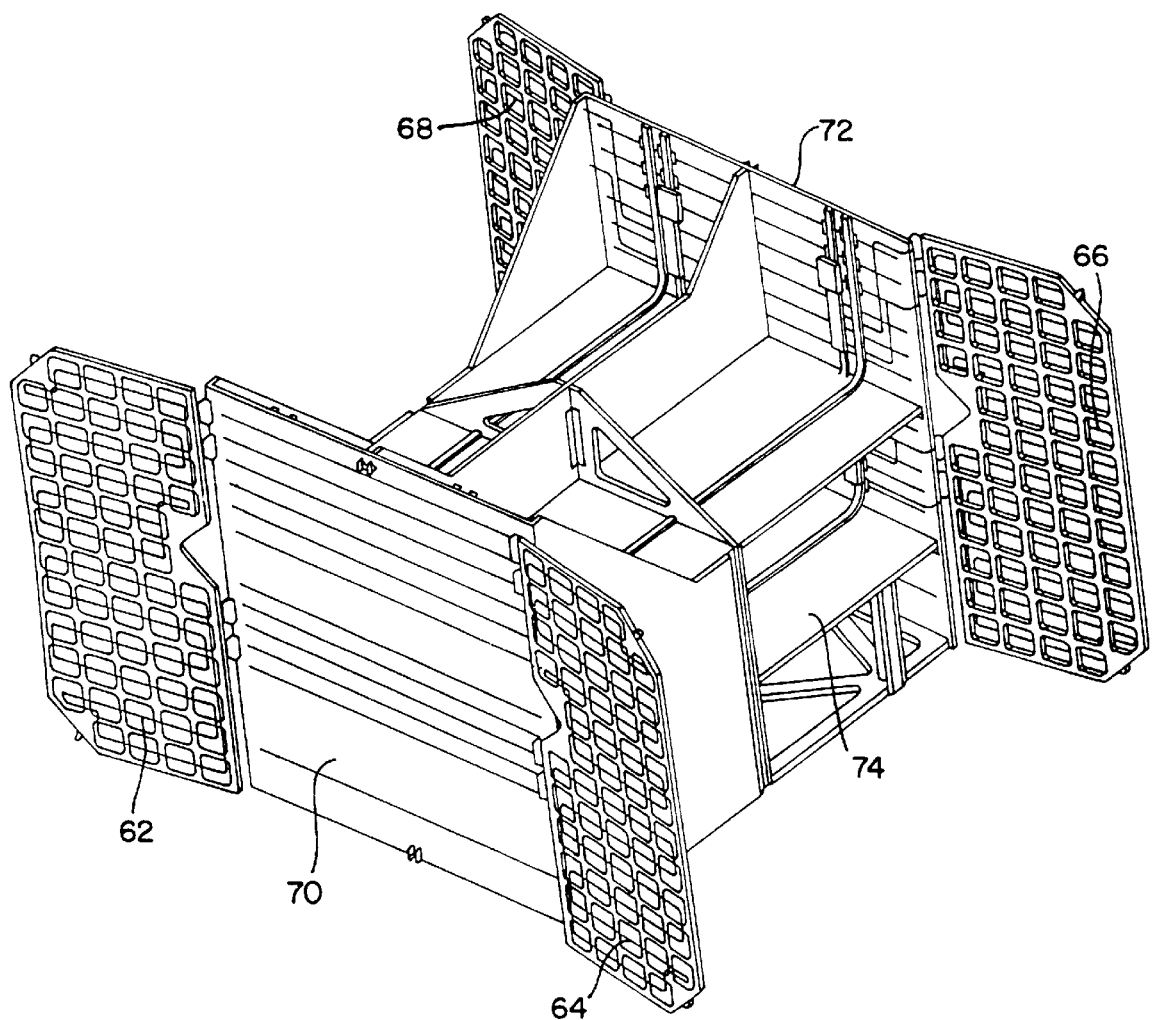
FIG. 3 is an illustration of a deployable radiator in the deployed position according to a preferred embodiment of the invention.

FIG. 3 is an illustration showing deployable radiators 62, 64, 66, 68 in the deployed position. Fixed radiators 70, 72 are exposed upon deployment of the deployable radiators. Before deployment, the deployable radiators 62, 64, 66, 68 cover the fixed radiators 70, 72 and serve as insulators for the satellite. After deployment, the heat rejecting surfaces of the deployable radiators 62, 64, 66, 68 are exposed to space and work to reject unwanted heat from the satellite. A removed panel shows the interior space 74 where the heat generating modules reside. Heat generating modules may also reside on the fixed radiators 70 and 72.

In an exemplary operation of the deployable radiators, the payload structure during launch will have deployable radiators folded or stowed over the satellite's fixed radiators. The deployable radiators are each in thermal communication with heat dissipating elements via heat pipes. The deployable radiators insulate the fixed radiators up until the time they are deployed. A KAPTON™ blanket on the exterior of the deployable radiators provides insulation. The radiators are secured to the payload structure with launch locks. Solar arrays are then free to deploy, with the power from the arrays being available to power elements such as electric propulsion systems. This is possible because the power from the arrays is not required to generate heat since the spacecraft is already insulated by the deployable radiator.

When heat rejection from within the satellite is necessary, the launch locks are opened either automatically or via a ground control command. A spring biased against the deployable radiators passively decompresses, thereby deploying the radiators. The heat pipes move hot vapor from heat sources within the satellite to the radiators, whereby unwanted heat is rejected from the satellite. The heat dissipating area can be more than double that of a fixed radiator alone.

It is therefore intended that the foregoing detailed description be regarded as illustrative rather than limiting, and that it be understood that it is the following claims, including all equivalents, which are intended to define the scope of the invention.

What is claimed is:

1. A spacecraft having a spacecraft body with at least one fixed radiator, said spacecraft comprising:

a deployable radiator hinged on said spacecraft body, such that said deployable radiator covers said fixed radiator when said deployable radiator is in a stowed position.

2. The spacecraft of claim 1, wherein said deployable radiator is secured in said stowed position by at least one launch lock.

3. The spacecraft of claim 2, wherein said deployable radiator is deployed by unsecuring said at least one launch lock.

4. The spacecraft of claim 1 comprising a material blanketing the exterior of said deployable radiator, said material being capable of limiting thermal radiation.

5. The spacecraft of claim 4, wherein said material is a multilayer aluminum deposited on KAPTON™ blanket.

6. A spacecraft having a spacecraft body with at least one fixed panel, said spacecraft comprising:

a deployable radiator hinged on said spacecraft body, such that said deployable radiator covers said fixed panel when said deployable radiator is in a stowed position; and a material blanketing the exterior of said deployable radiator, said material being capable of limiting thermal radiation.

7. The spacecraft of claim 6, wherein said material is a multilayer aluminum deposited on KAPTON™ blanket.

8. The spacecraft of claim 6, wherein said deployable radiator is secured in said stowed position by at least one launch lock.

9. The spacecraft of claim wherein said deployable radiator is deployed by unsecuring said at least one launch lock.

10. A method for using a deployable radiator as an insulator on a spacecraft structure, said structure having at least one fixed panel, comprising the steps of:

stowing said deployable radiator over said at least one fixed panel for a part of a space mission; and deploying said deployable radiator for a part of said mission, such that said deployable radiator is no longer stowed over said at least one fixed panel.

11. The method of claim 10, further comprising the step of blanketing said deployable radiator with a multilayer aluminum deposited on KAPTON™ blanket.

12. The method of claim 10, further comprising the step of blanketing said deployable radiator with a material capable of limiting thermal radiation.

13. A method for using a deployable radiator as an insulator on a spacecraft structure, said structure having at least one fixed radiator, comprising the steps of:

stowing said deployable radiator over said at least one fixed radiator for a part of a space mission; and deploying said deployable radiator for a part of said mission, such that said deployable radiator is no longer stowed over said at least one fixed radiator.

14. The method of claim 13, further comprising the step of blanketing said deployable radiator with a multilayer aluminum deposited on KAPTON™ blanket.

15. The method of claim further comprising the step of blanketing said deployable radiator with a material capable of limiting thermal radiation.

* * * * *